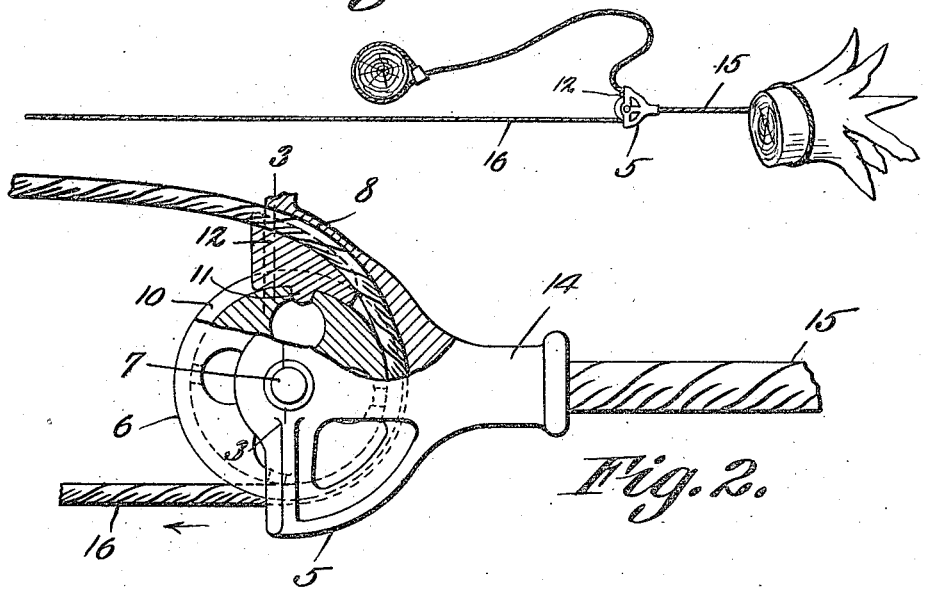

UNITED STATES PATENT OFFICE.

JAMES C. WILLIAMSON, OF CORDELE, GEORGIA.

CABLE LOCK.

1,425,732. Specification of Letters Patent. Patented Aug. 15, 1922.

Application filed March 7, 1921, Serial No. 450,198. Renewed January 3, 1922. Serial No. 526,811.

*To all whom it may concern:*

Be it known that I, JAMES C. WILLIAMSON, a citizen of the United States, residing at Cordele, in the county of Crisp and State of Georgia, have invented a new and useful Cable Lock, of which the following is a specification.

This invention relates to sheave or pulley locks, the primary object of the invention being to provide a novel form of wedge to be positioned between the cable or flexible member operating over the sheave or pulley for forcing the cable or flexible element into engagement with the wall of the pulley frame or housing to positively lock the cable against movement.

A further object of the invention is to provide a device of this character having novel means to eliminate any possibility of the locking element being thrown from the pulley and insure a tight gripping of the cable when the cable is being drawn over the pulley in one direction.

A still further object of the invention is the provision of a specially designed cable engaging surface to prevent the cable from slipping between the locking element and the pulley housing.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view showing the locking device as applied to a cable.

Figure 2 is a side elevational view of a pulley and its housing, the same being partly broken away to show the location of the wedge of the locking arm.

Figure 3 is a sectional view taken on line 3—3 of Figure 2.

Figure 4 is a plan view of the cable engaging groove of the wedge or locking element.

Referring to the drawing in detail, the reference character 5 designates the housing or frame in which is supported the pulley or sheave 6, there being provided suitable bearings to accommodate the shaft 7 on which the pulley 6 operates.

The housing 5 is provided with an offset portion 8 that is curved as at 9 to accommodate the curved surface of a flexible member such as a cable or the like.

The pulley 6 is provided with a peripheral groove 10 which is provided with openings in the base thereof to accommodate the lug 11 formed on one surface of the wedge or locking element 12, it being understood that the wedge 12 is provided with a tongue 13 to be footed on the peripheral groove to eliminate lateral movement of the wedge when the same is in operation.

This wedge is also provided with a grooved cable engaging surface 17 which is formed to correspond with the curvatures of the strands of wire making up the cable, so that when the cable is passed through the housing and moved to a position into engagement with the wall of the housing, the curved portions of the cable will seat themselves in the correspondingly-shaped recesses of the block, constituting a perfect lock without injury to the cable.

The housing 5 is also provided with a hollow extension 14 by means of which the cable 15 may be secured thereto in the well known manner.

In the operation of the device assuming that the cable which in the present instance is indicated by the reference character 16, is to be locked against movement in a clockwise direction, over the pulley, the wedge 12 is positioned on the pulley in a manner so that the lug 11 thereof will be seated in one of the openings in the periphery of the pulley, whereupon movement of the cable 16 in the direction of the arrow as shown by Figure 2 of the drawing, will set up a binding action between the wedge or locking member 12 and the curved inner wall of the housing.

It follows that further movement of the cable 16 results in causing the wedge 12 to more firmly grip the cable to eliminate movement thereof.

What is claimed as new is:—

In combination with a pulley, pulley housing and cable operating over the pulley, said pulley having a peripheral groove and having openings extending therethrough, a wedge-shaped locking member having a lug, said lug adapted to be positioned in one of the openings to restrict movement of the wedge with respect to the pulley, and said wedge-shaped members adapted to force the cable into engagement with the inner wall of the housing.

In testimony that I claim the foregoing as my own, I have hereto affixed my signature in the presence of two witnesses.

JAMES C. WILLIAMSON.

Witnesses:
 IVY E. SIMPSON,
 AGNES ROCKELLI.